(12) United States Patent
Hao et al.

(10) Patent No.: US 11,751,220 B2
(45) Date of Patent: Sep. 5, 2023

(54) SIGNAL SENDING AND RECEIVING METHODS AND DEVICES

(71) Applicant: ZTE Corporation, Guangdong (CN)

(72) Inventors: Peng Hao, Guangdong (CN); Shuqiang Xia, Guangdong (CN); Patrick Svedman, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/331,410

(22) Filed: May 26, 2021

(65) Prior Publication Data

US 2021/0306982 A1 Sep. 30, 2021

Related U.S. Application Data

(63) Continuation of application No. 16/370,869, filed on Mar. 29, 2019, now Pat. No. 11,026,211, which is a
(Continued)

(30) Foreign Application Priority Data

Sep. 30, 2016 (CN) .......................... 201610878654.3

(51) Int. Cl.
*H04W 72/30* (2023.01)
*H04L 5/00* (2006.01)
(Continued)

(52) U.S. Cl.
CPC ........... *H04W 72/30* (2023.01); *H04L 5/0051* (2013.01); *H04W 56/001* (2013.01); *H04W 72/0453* (2013.01); *H04W 74/0833* (2013.01)

(58) Field of Classification Search
None
See application file for complete search history.

(56) References Cited

U.S. PATENT DOCUMENTS 9,247,469 B2 1/2016 Seok et al.
2008/0101497 A1 5/2008 Gaikwad et al.
(Continued)

FOREIGN PATENT DOCUMENTS

| CN | 101682607 A | 3/2010 |
|---|---|---|
| CN | 102244631 A | 11/2011 |

(Continued)

OTHER PUBLICATIONS

Chinese Office Action dated Aug. 4, 2020 for Chinese Patent Application No. 201610878654.3, filed on Sep. 30, 2016 (8 pages).
(Continued)

*Primary Examiner* — Mariela Vidal Carpio
(74) *Attorney, Agent, or Firm* — Perkins Coie LLP

(57) ABSTRACT

Provided are a signal sending and receiving method and device. The signal sending device includes: a first transmission module (301), configured to send at least one of a signal and a channel to a second-type node on a first frequency domain resource set, or send at least one of the signal and the channel to the second-type node on the first frequency domain resource set and a second frequency domain resource set; where each of the first frequency domain resource set and the second frequency domain resource set is a resource element (RE) set on a physical carrier, and a position of the center RE of the first frequency domain resource set is associated with a channel number of the physical carrier.

26 Claims, 7 Drawing Sheets

Related U.S. Application Data continuation of application No. PCT/CN2017/103216, filed on Sep. 25, 2017.

(51) Int. Cl.
*H04W 56/00* (2009.01)
*H04W 72/0453* (2023.01)
*H04W 74/08* (2009.01)

(56) References Cited

U.S. PATENT DOCUMENTS

| | | |
|---|---|---|
| 2010/0027492 A1 | 2/2010 | Asanuma |
| 2011/0136498 A1* | 6/2011 | Ben-Eli ............... H04B 17/318 455/452.2 |
| 2012/0099542 A1 | 4/2012 | Yuk et al. |
| 2013/0022091 A1 | 1/2013 | Muralidhar et al. |
| 2013/0182680 A1 | 7/2013 | Choi et al. |
| 2015/0016573 A1* | 1/2015 | Imanilov ............... H04L 27/265 375/340 |
| 2016/0044580 A1 | 2/2016 | Alon et al. |
| 2016/0316442 A1 | 10/2016 | Seo et al. |
| 2016/0338056 A1* | 11/2016 | Xue ....................... H04W 48/16 |
| 2017/0070995 A1* | 3/2017 | Eitan ................. H04W 72/0453 |
| 2017/0163394 A1 | 6/2017 | Choi et al. |
| 2017/0245278 A1* | 8/2017 | Xue ................. H04W 72/0453 |
| 2017/0290016 A1* | 10/2017 | Yi ......................... H04L 5/0042 |
| 2017/0373812 A1* | 12/2017 | Berggren ............. H04L 5/0053 |
| 2018/0092084 A1* | 3/2018 | Yun ....................... H04L 5/0092 |
| 2018/0115403 A1 | 4/2018 | Sakai et al. |
| 2018/0323837 A1 | 11/2018 | Park et al. |
| 2019/0082434 A1* | 3/2019 | Young .................. H04L 5/0092 |
| 2020/0084733 A1* | 3/2020 | Palenius ............. H04J 11/0069 |
| 2021/0127358 A1* | 4/2021 | Li ........................ H04J 11/0069 |

FOREIGN PATENT DOCUMENTS

| | | | |
|---|---|---|---|
| CN | 102469467 A | 5/2012 | |
| CN | 103024834 A | 4/2013 | |
| CN | 104137579 B | 11/2014 | |
| CN | 105027650 A | 11/2015 | |
| CN | 105723792 A | 6/2016 | |
| EP | 1 906 686 A1 | 4/2008 | |
| EP | 1906686 A1 * | 4/2008 | .......... H04J 11/0069 |
| EP | 1906686 A1 | 4/2008 | |
| EP | 2642710 A1 | 9/2013 | |
| WO | 2014043922 A1 | 3/2014 | |
| WO | 2014/110815 A1 | 7/2014 | |
| WO | 2015/069000 A1 | 5/2015 | |
| WO | 2015109513 A1 | 7/2015 | |

OTHER PUBLICATIONS

Ericsson, "NB-IoT Channel Raster," 3GPP TSG-RAN1 NB-IOT Ad Hoc, Budapest, Hungary, R1-160082, 3 pages, Jan. 18-20, 2016.

International Search Report and Written Opinion dated Dec. 1, 2017 for International Application No. PCT/CN2017/103216, filed on Sep. 25, 2017 (11 pages).

Extended Search Report dated Sep. 29, 2020 for European Application No. 17854805.3, filed on Sep. 25, 2017 (10 pages).

Ericsson, "Overview of initial access and mobility," 3GPP TSG-RAN WG1 Meeting #86, Gothenburg, Sweden, R1-167055, 3 pages, Aug. 22-26, 2016.

Chinese Office Action dated Aug. 1, 2022 for Chinese Patent Application No. 202110037037.1, filed on Sep. 25, 2017. 12 pages with unofficial translation.

EPO, Communication pursuant to Article 94(3) EPC for European Application No. 17854805.3, dated Feb. 14, 2023, 9 pages.

\* cited by examiner

SIGNAL SENDING AND RECEIVING METHODS AND DEVICES

CROSS-REFERENCE TO RELATED APPLICATIONS

This patent document is a continuation of and claims priority to U.S. patent application Ser. No. 16/370,869, filed on Mar. 29, 2019, which is a continuation of and claims priority to International Patent Application No. PCT/CN2017/103216, filed on Sep. 25, 2017, which claims the benefit of priority of Chinese Patent Application No. 201610878654.3, filed on Sep. 30, 2016. The entire contents of the before-mentioned patent applications are incorporated by reference as part of the disclosure of this application.

TECHNICAL FIELD

The present disclosure relates to, but is not limited to, the field of wireless communications and, in particular, to a signal sending method and device and a signal receiving method and device.

BACKGROUND

In a wireless communication system, a terminal needs to search for a synchronization signal at each possible frequency point of a particular frequency band during initial access, handover or cell selection. After finding the synchronization signal, the terminal may complete downlink time synchronization and frequency synchronization with a physical carrier, detect a broadcast channel and acquire a system configuration message. The system configuration message includes information of a physical carrier bandwidth, configuration of a random access channel (or an uplink synchronization channel) and the like.

After acquiring the system configuration message, the terminal transmits a random access signal (or an uplink synchronization signal), that is, a signal transmitted on the random access channel, that is, a first message, and performs an uplink synchronization process. After successfully detecting the random access signal, a base station measures a timing advance, and transmits at least one of the timing advance or a random access signal identifier corresponding to the timing advance is transmitted to the terminal through a random access response signal (response information for the signal transmitted on the random access channel, that is, a second message). The terminal searches for an identifier of a random access signal used by the terminal, and transmits feedback information (information transmitted based on the response information, i.e., a third message) for the second message to the base station by using a timing advance corresponding to the identifier. The third message includes the identifier of the terminal. After the base station detects the third message, the base station transmits feedback information (i.e., a fourth message) for the third message, for confirming to the terminal that the uplink synchronization process has been completed.

In addition, for a simplified random access process, the terminal only transmits the first message including a signal for measuring the timing advance and a terminal identifier, and the base station only transmits the second message including at least one of the timing advance, the random access signal identifier and the terminal identifier in the received first message.

The physical carrier center frequency point (i.e., direct current frequency) is disposed on a frequency-domain location corresponding to a channel number. A frequency interval between adjacent channel numbers is referred to as a channel raster interval or a carrier raster interval. A frequency-domain step size used by the terminal for searching for the synchronization signal is referred to as a frequency raster interval or a user equipment (UE) raster interval. In the LTE system, the UE raster interval is the same as the channel raster interval. That is, the terminal searches for the synchronization signal on frequency-domain locations corresponding to all possible channel numbers.

In the 5th generation mobile communication system, in order to reduce the complexity of the terminal frequency domain search, the industry proposes to use a larger UE raster interval. That is, the UE raster interval may be larger than the channel raster interval (as shown in FIG. 2). In this case, the position of the center frequency point (i.e., the direct current frequency) of the synchronization signal, the broadcast channel, or other signal or channel associated with the initial access limits the minimum bandwidth of the system. That is because the frequency-domain resources occupied by these signals or channels cannot exceed the range of the frequency-domain resources of the physical carrier.

SUMMARY

The following is a summary of the subject matter described herein in detail. This summary is not intended to limit the scope of the claims.

In view of this, embodiments of the present disclosure provide a signal sending method and device and a signal receiving method and device.

The signal sending device includes:

a first transmission module, configured to send at least one of a signal and a channel to a second-type node on a first frequency domain resource set, or send at least one of the signal and the channel to the second-type node on the first frequency domain resource set and a second frequency domain resource set.

Each of the first frequency domain resource set and the second frequency domain resource set is a resource element (RE) set on a physical carrier, and a position of a center RE of the first frequency domain resource set is associated with a channel number of the physical carrier.

The signal sending method includes:

sending at least one of a signal and a channel to a second-type node on a first frequency domain resource set; or sending at least one of the signal and the channel to the second-type node on the first frequency domain resource set and a second frequency domain resource set.

Each of the first frequency domain resource set and the second frequency domain resource set is a resource element (RE) set on a physical carrier, and a position of a center RE of the first frequency domain resource set is associated with a channel number of the physical carrier.

The signal receiving device includes:

a second receiving module, configured to receive at least one of a signal and a channel on a first frequency domain resource set; or receive at least one of the signal and the channel on the first frequency domain resource set and a second frequency domain resource set.

Each of the first frequency domain resource set and the second frequency domain resource set is a resource element (RE) set on a physical carrier, and a position of a center RE of the first frequency domain resource set is associated with a channel number of the physical carrier.

The signal receiving method includes:

receiving at least one of a signal and a channel on a first frequency domain resource set; or receiving at least one of the signal and the channel on the first frequency domain resource set and a second frequency domain resource set.

Each of the first frequency domain resource set and the second frequency domain resource set is a resource element (RE) set on a physical carrier, and a position of a center RE of the first frequency domain resource set is associated with a channel number of the physical carrier.

The above-mentioned solution provides a signal sending method and device as well as a signal receiving method and device. According to the solution, a center frequency point of at least one of the signal and the channel associated with the initial access of the terminal is determined, and the allocation of frequency domain resources to at least one of the signal and the channel is more flexible. If the center frequency point of the first frequency domain resource set deviates from the center frequency point of the physical carrier, the available bandwidth of the first frequency domain resource set would be limited. In a case where the physical carrier bandwidth is small, the problem becomes more serious. The embodiments of the present disclosure may ensure that when the UE raster is sparser than the channel raster, the position of at least one synchronization signal direct current (DC) subcarrier (or a center subcarrier) has the least influence on the minimum bandwidth of the system, and the corresponding synchronization signal may be found by the UE. Therefore, the limitation on the minimum system bandwidth is reduced. The method provided in the embodiments of the present disclosure may flexibly allocate more frequency domain resources to at least one of the signal and the channel (especially at least one of a signal and a channel other than the synchronization channel or broadcast channel) in the initial access process. The resource utilization efficiency may be improved.

Other aspects can be understood after the drawings and detailed description are read and understood.

DETAILED DESCRIPTION

When the center frequency points of the synchronization signal, the broadcast channel or other signal or channel associated with the initial access is the same as the center frequency point of the physical carrier, the available bandwidth is the entire physical carrier bandwidth. However, when the center frequency point of the synchronization signal, the broadcast channel or other signal or channel associated with the initial access is different from the center frequency point of the physical carrier, the available bandwidth is less than the entire physical carrier bandwidth. When the physical carrier bandwidth is small, the problem becomes even more serious. In addition, the 5th generation mobile communication system will use a large physical carrier bandwidth for data transmission. However, in the initial access process, the terminal has not complete synchronization with the system. If the terminal or the base station sends or receives the signal or the channel associated with the initial access by using the carrier bandwidth same as that in the data transmission, the complexity of the terminal or the base station will be greatly improved.

Figure 1:
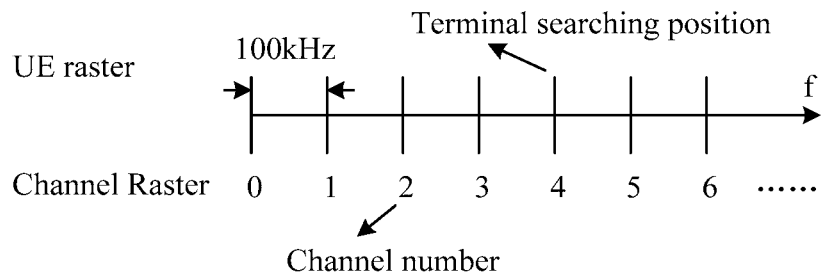
FIG. 1 is a schematic diagram showing that a UE raster is the same as a channel raster.
Figure 2:
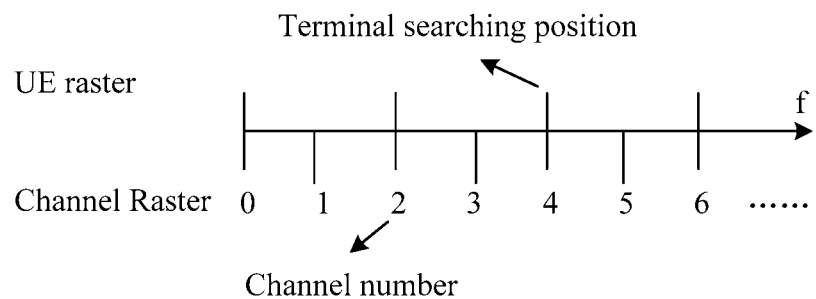
FIG. 2 is a schematic diagram showing that the UE raster is sparser than the channel raster.
Figure 3:
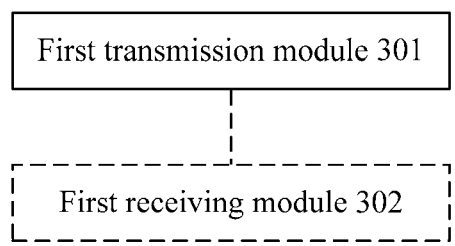
FIG. 3 is a structural diagram of a signal sending device according to an embodiment of the present disclosure.

FIG. 3 is a structural diagram of a signal sending device according to an embodiment of the present disclosure. Referring to FIG. 3, the device is disposed on a first-type node, such as the base station, and includes a first transmission module 301.

The first transmission module 301 is configured to send at least one of a signal and a channel to a second-type node on a first frequency domain resource set, or send at least one of the signal and the channel to the second-type node on the first frequency domain resource set and a second frequency domain resource set.

Each of the first frequency domain resource set and the second frequency domain resource set is a resource element (RE) set on a physical carrier, and a position of a center RE of the first frequency domain resource set is associated with a channel number of the physical carrier.

The first frequency domain resource set includes a resource block allocated based on the center RE of the first frequency domain resource set. That is, the center RE of the first frequency domain resource set is an edge RE of the resource block or a center RE of the resource block.

The bandwidth of the first frequency domain resource set is pre-set according to at least one of the signal and the channel sent by the first frequency domain resource set, and the bandwidth of the second frequency domain resource set is pre-set according to at least one of the signal and the channel sent by the second frequency domain resource set.

In an exemplary embodiment, the process in which the first transmission module sends at least one of the signal and the channel to the second-type node on the first frequency domain resource set includes: sending one of or any combination of a synchronization signal, a broadcast channel, a channel for sending a system message, a reference signal, response information for the signal transmitted on a random access channel, and feedback information for a random access process message.

In another exemplary embodiment, the process in which the first transmission module sends at least one of the signal and the channel to the second-type node on the second frequency domain resource set includes: sending one of or any combination of the synchronization signal, the broadcast channel, the channel for sending the system message, the reference signal, the response information for the signal transmitted on the random access channel, and the feedback information for the random access process message.

As an optional implementation mode of the present disclosure, the process in which the first transmission module sends at least one of the signal and the channel on the first frequency domain resource set to the second-type node includes: sending the synchronization signal on the first frequency domain resource set, or sending the synchronization signal and the broadcast channel on the first frequency domain resource set.

In an embodiment in which the first transmission module sends the synchronization signal and the broadcast channel on the first frequency domain resource set, the process in which the first transmission module sends at least one of the signal and the channel to the second-type node on the second frequency domain resource set includes: sending, on the second frequency domain resource set, one of or any combination of the channel for sending the system message, the reference signal, the response information for the signal transmitted on the random access channel and the feedback information for the random access process message.

In an optional implementation mode, the center RE of the synchronization signal or the broadcast channel is the same as the center RE of the first frequency domain resource set. Of course, the center RE of the synchronization signal or the broadcast channel may be different from the center RE of the first frequency domain resource set, which is not be limited by the embodiments of the present disclosure.

In an exemplary embodiment, the device further includes a first receiving module 302.

The first receiving module 302 is configured to receive at least one of the signal and the channel sent by the second-type node on a third frequency domain resource set.

In an exemplary embodiment, the process in which the first receiving module 302 receives at least one of the signal and the channel sent by the second-type node on the third frequency domain resource set includes: receiving, on the third frequency domain resource set, one of or any combination of: the response information for the signal transmitted on the random access channel and the feedback information for the random access process message.

In an exemplary embodiment, on the physical carrier, the number of the second frequency domain resource set is 1. When the number of the second frequency domain resource set is 1, multiple first frequency domain resource sets share one second frequency domain resource set. Of course, the number of the second frequency domain resource set may be more than one, which may be set according to actual requirements.

In an exemplary embodiment, at least one first frequency domain resource set exists on the physical carrier, and an index $x(n)$ of the center RE of the first frequency domain resource set satisfies a following condition:

within a subrange of the channel number n of the physical carrier, an absolute value of a difference of the indices of the center REs of the resource sets A corresponding to adjacent physical carrier channel numbers is $\Omega$, $\Omega+1$ or $\Omega-1$, where $\Omega$ is a constant, and $n \geq 0$.

In an exemplary embodiment, the subrange of the channel number n of the physical carrier is one of:
$n \in [0, Q-1]$, $n \in [Q+m \cdot P, Q+(m+1) \cdot P-1]$, $n \in [0, Q]$, or $n \in [Q+m \cdot P+1 \cdot P, Q+(m+1) \cdot P]$, where n is the channel number of the physical carrier,
$Q = \lfloor P/2 \rfloor$, $\lceil P/2 \rceil$ or $P/2$, m is an integer greater than or equal to 0, and P is a preset constant, a constant associated with a frequency band, or a ratio of a frequency scanning step size of the second-type node to a frequency interval of adjacent channel numbers.

In an exemplary embodiment, $x(0)=0$, and $\Omega=7$ or 6.

In an exemplary embodiment, in each interval, $x(n)$ is a monotonic increasing function of n or a monotonic decreasing function of n.

In an exemplary embodiment, the first transmission module 301 is configure to send to the second-type node identifiers of the center REs of the first frequency domain resource sets indicated by different sequences.

Alternatively, the first transmission module 301 is configured to notify, through the broadcast channel, information of the center RE of the first frequency domain resource set in which the broadcast channel is located to the second-type node.

Alternatively, the first transmission module 301 is configure to send the center RE of the second frequency domain resource set to the second-type node, where the center RE of the second frequency domain resource set is the same as the center RE of the physical carrier.

The first transmission module 301 is configured to notify, through the broadcast channel, the second-type node of position information of the center RE of the second frequency domain resource set.

In an exemplary embodiment, the first transmission module 301 is further configured to notify, through the broadcast channel, at least one of bandwidth information of the preset first frequency domain resource set and bandwidth information of the preset second frequency domain resource set.

In an exemplary embodiment, the process in which the first receiving module 302 receives at least one of the signal and the channel sent by the second-type node on the third frequency domain resource set includes:

receiving, on the uplink carrier corresponding to the physical carrier, at least one of the signal and the channel sent by the second-type node; receiving, on the third frequency domain resource set which is the same as the second frequency domain resource set, at least one of the signal and the channel sent by the second-type node; or receiving, on the third frequency domain resource set which is the same as the first frequency domain resource set, at least one of the signal and the channel sent by the second-type node.

For a frequency division duplex (FDD) system, the third frequency domain resource set is located on the uplink carrier corresponding to the physical carrier. Optionally, for a time division duplex (TDD) system, the third frequency domain resource set is the same as the second frequency domain resource set or the first frequency domain resource set.

When the system is the FDD system, a center RE of the third frequency domain resource set is the same as a center RE of the uplink carrier corresponding to the physical carrier.

The embodiments of the present disclosure further provide a base station, including the signal sending device described above. For the description of the signal sending device, reference may be made to the embodiment described above, and will not be repeated herein.

Figure 4:
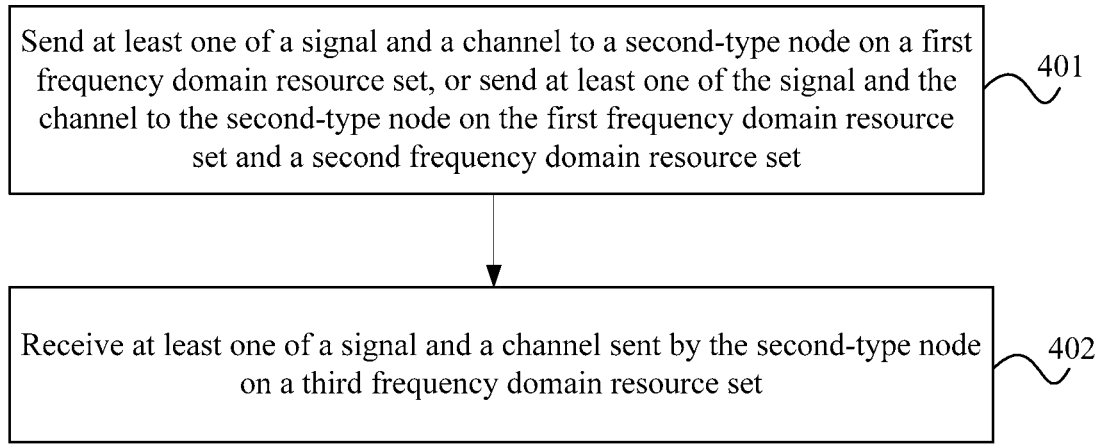
FIG. 4 is a schematic diagram of a signal sending method according to an embodiment of the present disclosure.

FIG. 4 is a schematic diagram of a signal sending method according to an embodiment of the present disclosure. Referring to FIG. 4, the method is applied to the first-type node, such as the base station, and includes steps described below.

In step 401, at least one of a signal and a channel is sent to a second-type node on a first frequency domain resource set; or at least one of the signal and the channel is sent to the second-type node on the first frequency domain resource set and a second frequency domain resource set.

In step 402, at least one of the signal and the channel sent by the second-type node is received on a third frequency domain resource set.

Each of the first frequency domain resource set and the second frequency domain resource set is a resource element (RE) set on the physical carrier, and the position of the center RE of the first frequency domain resource set is associated with the channel number of the physical carrier.

The first frequency domain resource set includes a resource block allocated based on the center RE of the first frequency domain resource set. That is, the center RE of the first frequency domain resource set is the edge RE of the resource block or the center RE of the resource block.

In an exemplary embodiment, the step of sending at least one of the signal and the channel to the second-type node on the first frequency domain resource set includes: sending one of or any combination of the synchronization signal, the broadcast channel, the channel for sending the system message, the reference signal, the response information (a second message) for the signal sent on the random access channel and the feedback information (a fourth message) for the random access process message.

In an exemplary embodiment, the step of sending at least one of the signal and the channel to the second-type node on the second frequency domain resource set includes: sending one of or any combination of the synchronization signal, the broadcast channel, the channel for sending the system message, the reference signal, the response information (the second message) for the signal sent on the random access channel and the feedback information (the fourth message) for the random access process message.

In an exemplary embodiment, the step of sending at least one of the signal and the channel on the first frequency domain resource set to the second-type node includes: sending the synchronization signal on the first frequency domain resource set, or sending the synchronization signal and the broadcast channel on the first frequency domain resource set.

In an embodiment, the synchronization signal and the broadcast channel are sent on the first frequency domain resource set, or the synchronization signal is sent on the first frequency domain resource set, correspondingly, the step of sending at least one of the signal and the channel to the second-type node on the second frequency domain resource set includes: sending, on the second frequency domain resource set, one of or any combination of the channel for sending the system message, the reference signal, the response information (the second message) for the signal sent on the random access channel, and the feedback information (the fourth message) for the random access process message.

In an exemplary embodiment, the center RE of the first frequency domain resource set may be the same as the center RE of the synchronization signal or the broadcast channel. Since the position of the synchronization signal does not need to be notified additionally, the signaling overhead may be reduced.

In an exemplary embodiment, the step of receiving, on the third frequency domain resource set, at least one of the signal and the channel sent by the second-type node includes: receiving, on the third frequency domain resource set, one of or any combination of the signal transmitted on the random access channel (a first message) and the feedback information (the third message) for the random access process message.

In an exemplary embodiment, the number of the second frequency domain resource set on the physical carrier is 1, which may reduce signal detection complexity for UE.

In an exemplary embodiment, the position of the center RE of the first frequency domain resource set is associated with the channel number of the physical carrier.

In an exemplary embodiment, at least one first frequency domain resource set exists on the physical carrier, and the index $x(n)$ of the center RE of the first frequency domain resource set satisfies a following condition:

within the subrange of the channel number n of the physical carrier, the absolute value of the difference of the indices of the center REs of the first frequency domain resource sets corresponding to adjacent physical carrier channel numbers is $\Omega$, $\Omega+1$ or $\Omega-1$, where $\Omega$ is a constant, and $n \geq 0$.

In an exemplary embodiment, the subrange of the channel number n of the physical carrier is one of:
$n \in [0, Q-1]$, $n \in [Q+m \cdot P, Q+(m+1) \cdot P-1]$, $n \in [0, Q]$, or $n \in [Q+m \cdot P+1 \cdot P, Q+(m+1) \cdot P]$, where n is the channel number of the physical carrier,
$Q = \lfloor P/2 \rfloor$, $\lceil P/2 \rceil$ or $P/2$, m is an integer greater than or equal to 0, and P is a preset constant, a constant associated with the frequency band, or a ratio of the frequency scanning step size of the second-type node to the frequency interval of adjacent channel numbers.

In an exemplary embodiment, $x(0)=0$.

In an exemplary embodiment, $\Omega=7$ or $\Omega=6$.

In an exemplary embodiment, the information of the center REs of the first frequency domain resource sets are indicated by different sequences.

In another exemplary embodiment, the information of the center RE of the first frequency domain resource set where the broadcast channel is located is notified to the second-type node through the broadcast channel.

In an exemplary embodiment, the center RE of the second frequency domain resource set is the same as the center RE of the physical carrier.

In another exemplary embodiment, the position information of the center RE of the second frequency domain resource set is sent to the second-type node through the broadcast channel.

In an embodiment, the method further includes: sending, through the broadcast channel, at least one of the bandwidth information of the preset first frequency domain resource set and the bandwidth information of the preset second frequency domain resource set.

In an embodiment, when the system is the FDD system, the third frequency domain resource set is located on the uplink carrier corresponding to the physical carrier; when the system is the TDD system, the third frequency domain resource set is the same as the second frequency domain resource set, or the third frequency domain resource set is the same as the first frequency domain resource set.

When the system is the FDD system, the center RE of the third frequency domain resource set is the same as the center RE of the uplink carrier corresponding to the physical carrier.

Figure 5:
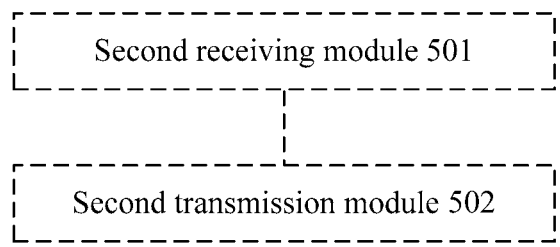
FIG. 5 is a structural diagram of a signal receiving device according to an embodiment of the present disclosure.

FIG. 5 is a structural diagram of a signal receiving device according to an embodiment of the present disclosure. Referring to FIG. 5, the device is disposed on the second-type node, such as the terminal, and includes a second receiving module 501.

The second receiving module 501 is configured to receive at least one of the signal and the channel on the first frequency domain resource set, or receive at least one of the signal and the channel on the first frequency domain resource set and the second frequency domain resource set.

Each of the first frequency domain resource set and the second frequency domain resource set is a resource element (RE) set on the physical carrier, and the position of the center RE of the first frequency domain resource set is associated with the channel number of the physical carrier.

The second receiving module 501 is configured to receive at least one of the signal and the channel on the resource block allocated based on the center RE of the first frequency domain resource set. That is, the center RE of the first frequency domain resource set is the edge RE of the resource block or the center RE of the resource block.

In an embodiment, the process in which the second receiving module 501 receives at least one of the signal and the channel on the first frequency domain resource set includes: receiving one of or any combination of the synchronization signal, the broadcast channel, the channel for sending the system message, the reference signal, the response information for the signal sent on the random access channel and the feedback information for the random access process message.

Alternatively, the process in which the second receiving module 501 receives at least one of the signal and the channel on the second frequency domain resource set includes: receiving one of or any combination of the synchronization signal, the broadcast channel, the channel for sending the system message, the reference signal, the response information for the signal sent on the random access channel and the feedback information for the random access process message.

In an embodiment, the process in which the second receiving module 501 receives at least one of the signal and the channel on the first frequency domain resource set includes: receiving the synchronization signal on the first frequency domain resource set, or receiving the synchronization signal and the broadcast channel on the first frequency domain resource set.

When the second receiving module receives the synchronization signal and the broadcast channel on the first frequency domain resource set, correspondingly, the process in which the second receiving module receives at least one of the signal and the channel on the second frequency domain resource set includes: receiving, on the second frequency domain resource set, one of or any combination of the channel for sending the system message, the reference signal, the response information of the signal sent on the random access channel and the feedback information of the random access process message.

In an embodiment, the device further includes a second transmission module 502.

The second transmission module 502 is configured to send at least one of the signal and the channel to the first-type node on the third frequency domain resource set.

In an embodiment, the process in which the second transmission module 502 sends at least one of the signal and the channel to the first-type node on the third frequency domain resource set includes: sending, on the third frequency domain resource set, one of or any combination of the signal transmitted on the random access channel and the feedback information of the random access process message.

In an embodiment, the number of the second frequency domain resource set on the physical carrier is 1. When the number of the second frequency domain resource set is 1, multiple first frequency domain resource sets share one second frequency domain resource set. Of course, the number of the second frequency domain resource set may be more than one, which may be set according to actual requirements.

In an embodiment, the position of the center RE of the first frequency domain resource set is associated with the channel number of the physical carrier.

In an embodiment, at least one first frequency domain resource set exists on the physical carrier, and the index x(n) of the center RE of the first frequency domain resource set satisfies a following condition:

within the subrange of the channel number n of the physical carrier, the absolute value of the difference of the indices of the center REs of the first frequency domain resource sets corresponding to adjacent physical carrier channel numbers is $\Omega$, $\Omega+1$ or $\Omega-1$, where $\Omega$ is a constant, and n≥0.

In an embodiment, the subrange of the channel number n of the physical carrier is one of:
n∈[0,Q−1], n∈[Q+m·P,Q+(m+1)·P−1], n∈[0,Q], or
n∈[Q+m·P+1·P,Q+(m+1)·P], where n is the channel number of the physical carrier,
$Q=\lfloor P/2 \rfloor$, $\lceil P/2 \rceil$ or P/2, m is an integer greater than or equal to 0, and P is a preset constant, a constant associated with the frequency band, or a ratio of the frequency scanning step size of the second-type node to the frequency interval of adjacent channel numbers.

In an embodiment, x(0)=0, and $\Omega$=7 or $\Omega$=6.

In an embodiment, the second receiving module 501 is configure to receive the information of the center REs of the first frequency domain resource sets indicated by different sequences.

In an alternative embodiment, the second receiving module 501 is configure to receive, through the broadcast channel, the information of the center RE of the first frequency domain resource set where the broadcast channel is located.

In an embodiment, the second receiving module 501 is configure to receive the center RE of the second frequency domain resource set being the same as the center RE of the physical carrier.

In an alternative embodiment, the second receiving module 501 is configured to receive, through the broadcast channel, the position information of the center RE of the second frequency domain resource set.

In an embodiment, the second receiving module 501 is further configured to receive, through the broadcast channel, at least one of the bandwidth information of the preset first frequency domain resource set and the bandwidth information of the preset second frequency domain resource set.

In an embodiment, the second transmission module 502 sends, according to parameters associated with the third frequency domain resource set, at least one of the signal and the channel on the third frequency domain resource set, including:

sending, on the uplink carrier corresponding to the physical carrier, at least one of the signal and the channel to the first-type node; or sending, on the third frequency domain resource set which is the same as the first frequency domain resource set or the second frequency domain resource set, at least one of the signal and the channel to the first-type node.

For the FDD system, the third frequency domain resource set is located on the uplink carrier corresponding to the physical carrier. For the TDD system, the third frequency domain resource set is the same as the second frequency domain resource set or the first frequency domain resource set.

When the system is the FDD system, the center RE of the third frequency domain resource set is the same as the center RE of the uplink carrier corresponding to the physical carrier.

The embodiments of the present disclosure further provide a terminal, including the signal receiving device described above. For the description of the signal receiving device, reference may be made to the embodiment described above, and will not be repeated herein.

Figure 6:
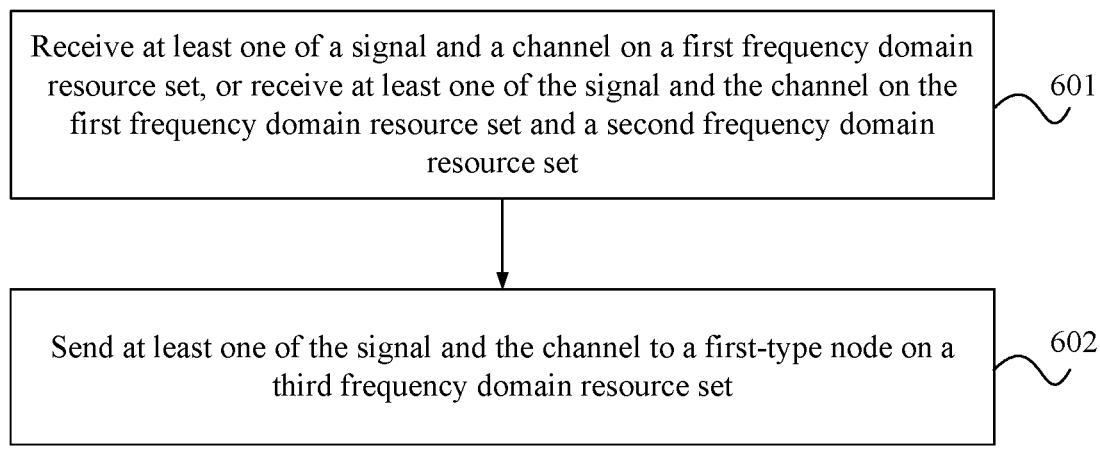
FIG. 6 is a schematic diagram of a signal receiving method according to an embodiment of the present disclosure.

FIG. 6 is a flowchart of a signal receiving method according to an embodiment of the present disclosure. Referring to FIG. 6, the method is applied to the second-type node, such as the terminal, and includes steps described below.

In step 601, at least one of a signal and a channel is received on a first frequency domain resource set; or at least one of the signal and the channel is received on the first frequency domain resource set and a second frequency domain resource set.

In step 602, at least one of the signal and the channel is sent to a first-type node on a third frequency domain resource set.

Each of the first frequency domain resource set and the second frequency domain resource set is a resource element (RE) set on the physical carrier, and the position of the center RE of the first frequency domain resource set is associated with the channel number of the physical carrier.

The first frequency domain resource set includes the resource block allocated based on the center RE of the first frequency domain resource set. That is, the center RE of the first frequency domain resource set is the edge RE of the resource block or the center RE of the resource block.

The step in which at least one of the signal and the channel is received on the first frequency domain resource set includes: receiving one of or any combination of the synchronization signal, the broadcast channel, the channel for sending the system message, the reference signal, the response information (the second message) of the signal sent on the random access channel and the feedback information (the fourth message) of a random access process message.

In an alternative embodiment, the step in which at least one of the signal and the channel is received on the second frequency domain resource set includes: receiving one of or any combination of the synchronization signal, the broadcast channel, the channel for sending the system message, the reference signal, the response information (the second message) of the signal sent on the random access channel (the second message) and the feedback information of a random access process message.

In an embodiment, the step in which at least one of the signal and the channel is received on the first frequency domain resource set includes: receiving the synchronization signal on the first frequency domain resource set, or receiving the synchronization signal and the broadcast channel on the first frequency domain resource set.

When the synchronization signal and the broadcast channel are received on the first frequency domain resource set, or the synchronization signal is received on the first frequency domain resource set, correspondingly, the step in which at least one of the signal and the channel is received on the second frequency domain resource set includes: receiving, on the second frequency domain resource set, one of or any combination of: the channel for sending the system message, the reference signal, the response information of the signal sent on the random access channel and the feedback information of the random access process message.

In an embodiment, the step in which at least one of the signal and the channel is sent on the third frequency domain resource set includes: sending, on the third frequency domain resource set, one of or any combination of: the signal (the first message) sent on the random access channel and the feedback information (the third message) of the random access process message.

In an embodiment, on the physical carrier, the number of the second frequency domain resource set is 1.

In an embodiment, the position of the center RE of the first frequency domain resource set is associated with the channel number of the physical carrier.

In an embodiment, at least one first frequency domain resource set exists on the physical carrier, and an index $x(n)$ of the center RE of the first frequency domain resource set satisfies a following condition:

within the subrange of the channel number n of the physical carrier, the absolute value of the difference of the indices of the center REs of the resource sets A corresponding to adjacent physical carrier channel numbers is $\Omega$, $\Omega+1$ or $\Omega-1$, where $\Omega$ is a constant, and $n \geq 0$.

In an embodiment, the subrange of the channel number of the physical carrier is one of:
$n \in [0, Q-1]$, $n \in [Q+m \cdot P, Q+(m+1) \cdot P-1]$, $n \in [0, Q]$, or $n \in [Q+m \cdot P+1 \cdot P, Q+(m+1) \cdot P]$, where n is the channel number of the physical carrier,
$Q = \lfloor P/2 \rfloor$, $\lceil P/2 \rceil$ or $P/2$, m is an integer greater than or equal to 0, and P is a preset constant, a constant associated with the frequency band, or a ratio of the frequency scanning step size of the second-type node to the frequency interval of adjacent channel numbers.

In an embodiment, $x(0)=0$.

In an embodiment, $\Omega=7$ or $\Omega=6$.

In an embodiment, the information of the center REs of the first frequency domain resource sets indicated with different sequences is received.

Alternatively, the information of the center RE of the first frequency domain resource set where the broadcast channel is located is received through the broadcast channel.

In an embodiment, the center RE of the second frequency domain resource set which is the same as the center RE of the physical carrier is received.

Alternatively, the position information of the center RE of the second frequency domain resource set is received through the broadcast channel.

In an embodiment, the method further includes: receiving, through the broadcast channel, at least one of the bandwidth information of the preset first frequency domain resource set and the bandwidth information of the preset second frequency domain resource set.

In an embodiment, the step in which at least one of the signal and the channel is sent on the third frequency domain resource set includes:
sending, on the uplink carrier corresponding to the physical carrier, at least one of the signal and the channel to the first-type node; sending, on the third frequency domain resource set which is the same as the second frequency domain resource set, at least one of the signal and the channel to the first-type node; or sending, on the third frequency domain resource set which is the same as the first frequency domain resource set, at least one of the signal and the channel to the first-type node.

When the system is the FDD system, the third frequency domain resource set is located on the uplink carrier corresponding to the physical carrier. Alternatively, when the system is the TDD system, the third frequency domain resource set is the same as the first frequency domain resource set, or the third frequency domain resource set is the same as the second frequency domain resource set.

When the system is the FDD system, the center RE of the third frequency domain resource set is the same as the center RE of the uplink carrier corresponding to the physical carrier.

The present disclosure will be described below in detail through examples in specific applications.

EXAMPLE 1

If an index of the center subcarrier (e.g., the DC sub carrier of the physical carrier) of the resource set or the physical carrier is 0, subcarriers whose frequency domain positions are lower than that of the center subcarrier are respectively numbered, according to their distances to the center subcarrier in an ascending mode, as −1, −2, −3 and . . . ; and subcarriers whose frequency domain positions are higher than that of the center subcarrier are respectively numbered, according to their distances to the center subcarrier in an ascending mode, as 1, 2, 3 and . . . . The subcarrier is also referred to as a resource element (RE).

It is assumed that the number of REs of the physical carrier or the resource set is N. When N is an odd number, the number of REs whose frequency domain positions are lower than that of the center RE is equal to the number of REs whose frequency domain positions are higher than that of the center RE, and the number is $\lfloor N/2 \rfloor$. When N is an even number, the number of REs whose frequency domain positions are lower than that of the center RE is N/2 (or N/2−1), while the number of REs whose frequency domain positions are higher than that of the center RE is N/2−1 (or N/2).

In addition, the REs of the physical carrier, the resource set or the resource block may also be numbered as 0, 1, 2, . . . , and N−1 from the lowest frequency domain position to the highest frequency domain position. When N is the odd number, the center RE is numbered as $\lfloor N/2 \rfloor$, while when N is the even number, the center RE is numbered as N/2−1 or N/2+1.

EXAMPLE 2

When the UE raster interval (or the step size used by the terminal for frequency scanning) is 2000 kHz and the channel raster interval (or the frequency spacing of adjacent channel numbers) is 100 kHz, P=2000/100=20 and Q=P/2=10.

Alternatively, when a specified constant of the communication system is 2000 kHz and the channel raster interval (or the frequency spacing of adjacent channel numbers) is 100 kHz, P=2000/100=20 and Q=P/2=10.

Alternatively, the communication system sets that P=20, and Q=P/2=10.

Alternatively, in the low frequency bandwidth (the carrier frequency is less than or equal to 6 GHz), the specified constant of the system is 2000 kHz, the channel raster interval (or the frequency spacing of adjacent channel numbers) is 100 kHz, P=2000/100=20 and Q=P/2=10. In the high frequency bandwidth (the carrier frequency is greater than 6 GHz), the specified constant of the system is 10000 kHz, the channel raster interval (or the frequency spacing of adjacent channel numbers) is 100 kHz, P=10000/100=100 and Q=P/2=50. Alternatively, the channel raster interval in the high frequency bandwidth may be greater than the channel raster interval in the low frequency bandwidth.

EXAMPLE 3

Within the subrange of the channel number n of the physical carrier, the difference of the indices x(n) of the center REs of the first frequency domain resource sets corresponding to adjacent physical carrier channel numbers is $\Omega$, $\Omega+1$ or $\Omega-1$, where $\Omega$ is a constant, and n≥0. That is, |x(n+1)−x(n)|=$\Omega$, $\Omega+1$ or $\Omega-1$, or |x(n−1)−x(n)|=$\Omega$, $\Omega+1$, $\Omega-1$.

When the subcarrier bandwidth (or the subcarrier interval) is 15 kHz, P=20, Q =P/2=10 and x(0)=0, within the channel number interval n∈[0,Q−1] (i.e., 0≤n≤Q−1=9), the indices of the center REs of the first frequency domain resource sets corresponding to adjacent channel numbers are {0, −7, −13, −20, −27, −33, −40, −47, −53, −60}.

Figure 7:
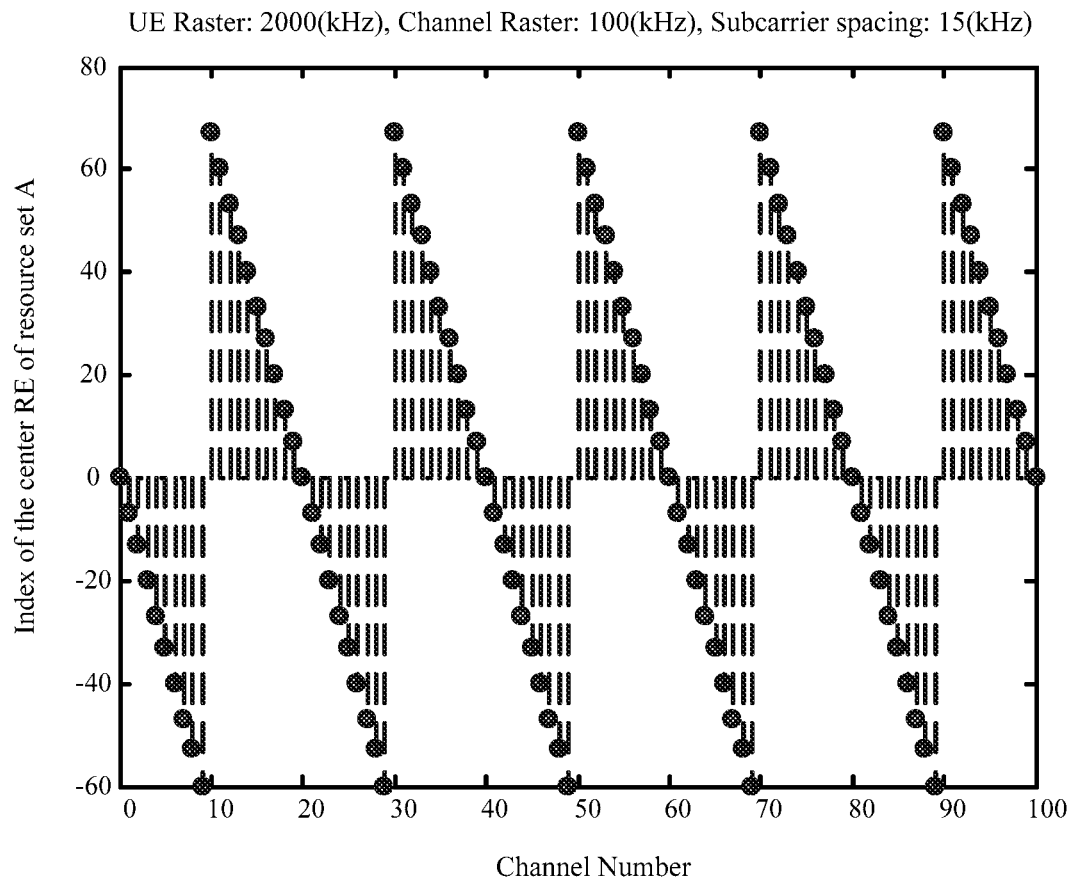
FIG. 7 is a schematic diagram of an application example 3 of the present disclosure.

Within the channel number interval n∈[Q+m·P, Q+(m+1)·P−1] (i.e., 10+m*20≤n≤10+(m+1)*20−1, where m=0, 1, 2, and . . . ), the indices of the center REs of the first frequency domain resource sets corresponding to adjacent channel numbers are {67, 60, 53, 47, 40, 33, 27, 20, 13, 7, 0, −7, −13, −20, −27, −33, −40, −47, −53, −60}. As shown in FIG. 7, within each subrange of the channel numbers, x(n) is the monotonic decreasing function. When $\Omega$=7, |x(n+1)−x(n)|=$\Omega$ (=7) or $\Omega-1$ (=6); and when $\Omega$=6, |x(n+1)−x(n)|=$\Omega$ (=6) or $\Omega+1$ (=7).

When the first frequency domain resource set is used for transmitting the synchronization signal and the center RE of the first frequency domain resource set is the same as the center RE of the synchronization signal, the offset between the center frequency point of each first frequency domain resource set and the closest UE raster position does not exceed half of the bandwidth of the RE (or subcarrier). Since the offset may be corrected by the frequency offset correction, the offset will not affect the terminal's searching for the synchronization signal. At the same time, the center RE of each first frequency domain resource set is closest to the center RE of the physical carrier corresponding to the channel number corresponding to the first frequency domain resource set, thereby reducing the limitation on the minimum physical carrier bandwidth.

For example, for the channel number n=19, the center frequency point of the physical carrier is f_low+1900 kHz, the index of the center RE of the first frequency domain resource set is 7, and the center frequency point of the center RE of the synchronization signal is the same as the center frequency point of the center RE of the first frequency domain resource set, that is, f_low+1900 kHz+15*7=f_low+2005. Since the difference between the center frequency point of the center RE of the synchronization signal and the frequency point f_low+2000 of the closest UE raster position is 5 kHz which is less than the half of the subcarrier interval (i.e., 15/2=7.5 kHz), the synchronization signal can be found by the UE. f_low is the center frequency point of the physical carrier corresponding to the channel number n=0. In addition, among the center REs of all synchronization signals, the RE whose index is 7 is the closest to the center frequency point of the physical carrier.

EXAMPLE 4

Within the subrange of the channel number n of the physical carrier, the difference of the indices x(n) of the center REs of the first frequency domain resource sets corresponding to adjacent physical carrier channel numbers is $\Omega$, $\Omega+1$ or $\Omega-1$, where $\Omega$ is a constant, and n≥0. That is, |x(n+1)−x(n)|=$\Omega$, $\Omega+1$ or $\Omega-1$. Alternatively, |x(n−1)−x(n)|=$\Omega$, $\Omega+1$ or $\Omega-1$.

When the subcarrier bandwidth (or the subcarrier interval) is 15 kHz, P=20, Q=P/2=10 and x(0)=0, within the channel number interval n∈[0,Q] (i.e., 0≤n≤Q=10), the indices of the center REs of the first frequency domain resource sets corresponding to adjacent channel numbers are respectively {0, −7, −13, −20, −27, −33, −40, −47, −53, −60, −67}.

Within the channel number interval n∈[Q+m·P+1·P,Q+(m+1)·P] (i.e., 10+m*20+1≤n≤10+(m+1)*20, where m=0, 1, 2, and . . . ), the indices of the center REs of the first frequency domain resource sets corresponding to adjacent channel numbers are respectively {60, 53, 47, 40, 33, 27, 20, 13, 7, 0, −7, −13, −20, −27, −33, −40, −47, −53, −60, −67}.

EXAMPLE 5

Figure 8:
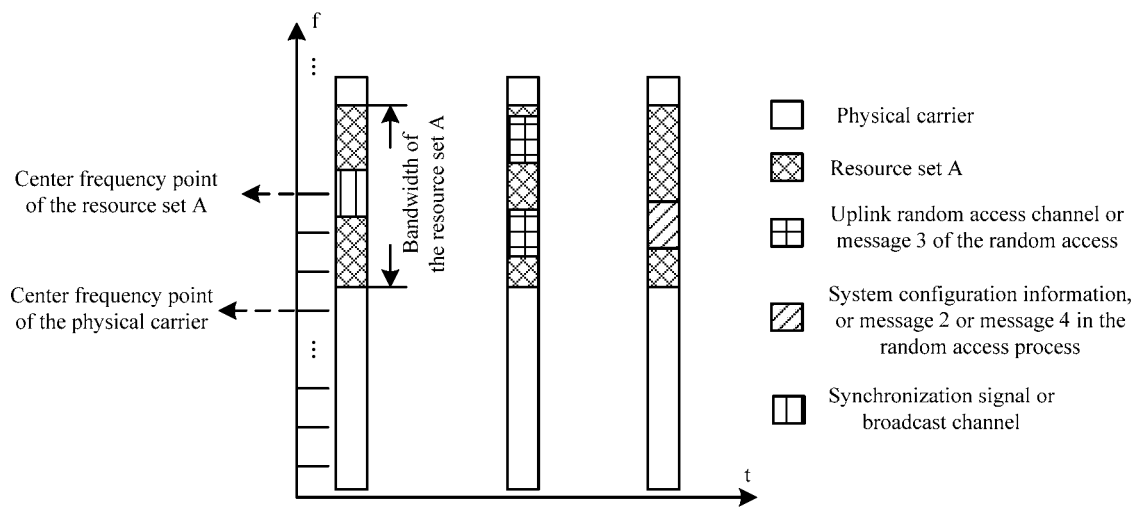
FIG. 8 is a schematic diagram of an application example 5 of the present disclosure.

As shown in FIG. 8, for the TDD system, the center frequency point of the physical carrier is located at the channel raster with the channel number n=18, the UE raster interval is 2000 kHz, the channel raster interval is 100 kHz, and the subcarrier interval is 15 kHz. The center frequency point of the physical carrier is f_low+1800 kHz. The index of the center RE of the first frequency domain resource set is 13. The first frequency domain resource set is used for mapping the synchronization signal and the broadcast channel. The center RE of the synchronization signal and the center RE of the broadcast channel are the same as the center RE of the first frequency domain resource set. The center frequency point of the synchronization signal and the center frequency point of the broadcast channel are f_low+1800+195 kHz=f_low+1950 kHz. The first frequency domain resource set is also used for mapping the channels/the signals in the initial access process other than the synchronization signal and the broadcast channel, where the channels/the signals include the random access channel, the channel carrying the system configuration information (i.e., the system information which is not sent in the broadcast channel), and the channel carrying the second message, the channel carrying the third message and the channel carrying the fourth message in the random access process. The channels described above may be sent at different times.

EXAMPLE 6

Figure 9:
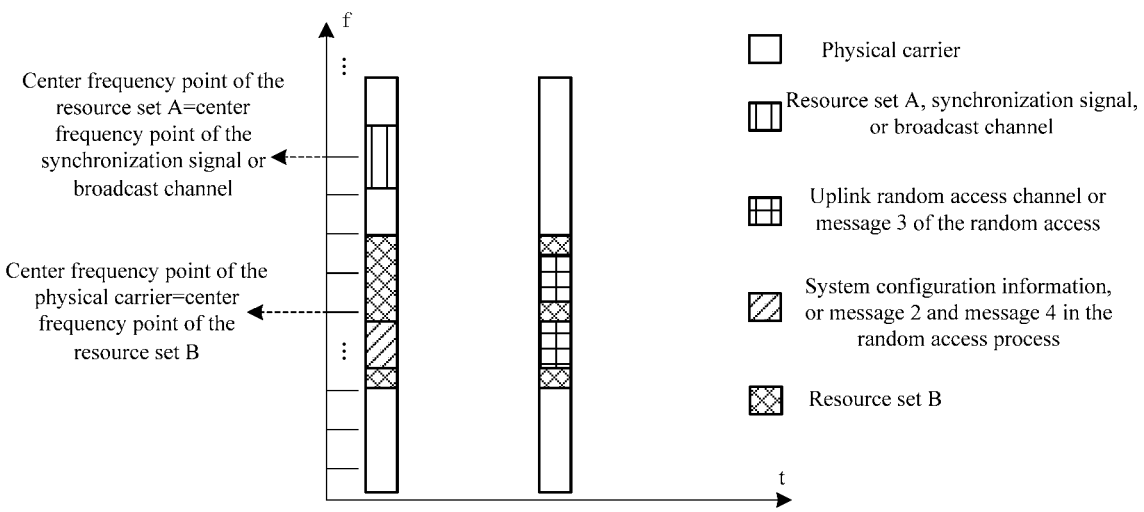
FIG. 9 is a schematic diagram of an application embodiment 6 of the present disclosure.

As shown in FIG. 9, for the TDD system, the center frequency point of the physical carrier is located on the channel raster with the channel number n=18, the UE raster interval is 2000 kHz, the channel raster interval is 100 kHz, and the subcarrier interval is 15 kHz. The center frequency point of the physical carrier is f_low+1800 kHz. The index of the center RE of the first frequency domain resource set is 13. The first frequency domain resource set is used for mapping the synchronization signal or the broadcast channel. The center RE of the synchronization signal or the center RE of the broadcast channel is the same as the center RE of the first frequency domain resource set. The number of the REs of the first frequency domain resource set is the same as the number of the REs occupied by the synchronization signal or the number of the REs occupied by the broadcast channel. The center frequency point of the synchronization signal or the center frequency point of the broadcast channel is f_low+1800+195 kHz=f_low+1950 kHz. The center RE of the second frequency domain resource set is the same as the center RE of the physical carrier. That is, the center frequency point of the second frequency domain resource set is f_low+1800. The second frequency domain resource set is used for mapping the channels/the signals in the initial access process other than the synchronization signal and the broadcast channel, the channels/signals include the random access channel, the channel carrying the system configuration information (i.e., the system information which is not sent in the broadcast channel), and the channel carrying the second message, the channel carrying the third message and the channel carrying the fourth message in the random access process.

In this application example, the third frequency domain resource set is not involved, which may be interpreted to be that the third frequency domain resource set does not exist, or be interpreted to be that the third frequency domain resource set is the same as the second frequency domain resource set. The channels described above may be sent at different times.

EXAMPLE 7

Figure 10:
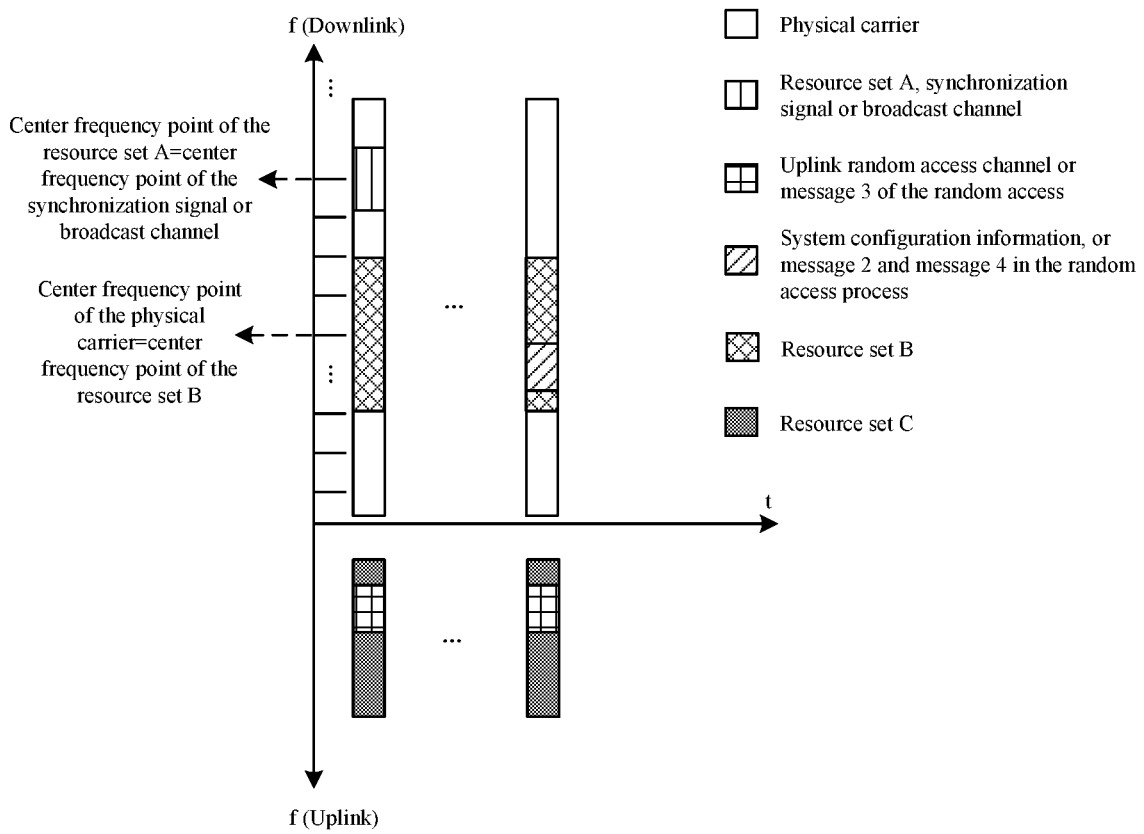
FIG. 10 is a schematic diagram of an application example 7 of the present disclosure.

As shown in FIG. 10, for the FDD system, the center frequency point of the downlink physical carrier is located on the channel raster with the channel number n=18, the UE raster interval is 2000 kHz, the channel raster interval is 100 kHz, and the subcarrier interval is 15 kHz. The center frequency point of the downlink physical carrier is f_low+1800 kHz. The index of the center RE of the first frequency domain resource set is 13. The first frequency domain resource set is used for mapping the synchronization signal and the broadcast channel. The center RE of the synchronization signal or the center RE of the broadcast channel is the same as the center RE of the first frequency domain resource set. The center frequency point of the synchronization signal or the center frequency point of the broadcast channel is f_low+1800+195 kHz=f_low+1950 kHz. The center RE of the second frequency domain resource set is the same as the center RE of the physical carrier. That is, the center frequency point of the second frequency domain resource set is f_low+1800 kHz. The second frequency domain resource set is used for mapping the channels/the signals in the initial access process other than the synchronization signal and the broadcast channel, the channels/the signals include the channel carrying the system configuration information (i.e., the system information which is not sent in the broadcast channel), and the channel carrying the second message and the channel carrying the fourth message in the random access process.

The third frequency domain resource set is located on the uplink physical carrier, used for mapping the random access channel and the third message in the random access process. A fixed offset exists between the center frequency point of the uplink physical carrier and the center frequency point of the downlink physical carrier. The terminal, after detecting the down physical carrier, finds the uplink physical carrier according to the fixed offset. Alternatively, the center frequency point of the uplink physical carrier is notified to the terminal through the system message. The channels described above may be sent at different times.

EXAMPLE 8

Figure 11:
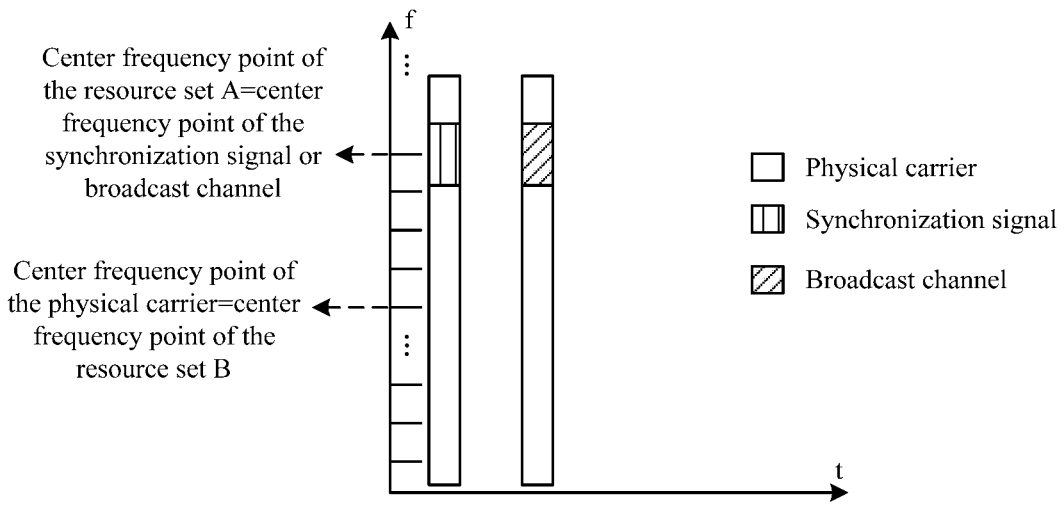
FIG. 11 is a schematic diagram of an application example 8 of the present disclosure.

As shown in FIG. 11, for the TDD system, the center frequency point of the physical carrier is located on the channel raster with the channel number n=18, the UE raster interval is 2000 kHz, the channel raster interval is 100 kHz, and the subcarrier interval is 15 kHz. The center frequency point of the physical carrier is f_low+1800 kHz. The index of the center RE of the first frequency domain resource set is 13.

The first frequency domain resource set is used for mapping the synchronization signal and the broadcast channel. The center RE of the synchronization signal and the center RE of the broadcast channel are the same as the center RE of the first frequency domain resource set. The synchronization signal and the broadcast channel are sent at different times, that is, in the time division multiplexing mode. The center frequency point of the synchronization signal or the center frequency point of the broadcast channel is f_low+1800+195 kHz=f_low+1950 kHz. The number of the REs of the first frequency domain resource set is the equal to the number of the REs occupied by the synchronization signal or the number of the REs occupied by the broadcast channel.

EXAMPLE 9

Figure 12:
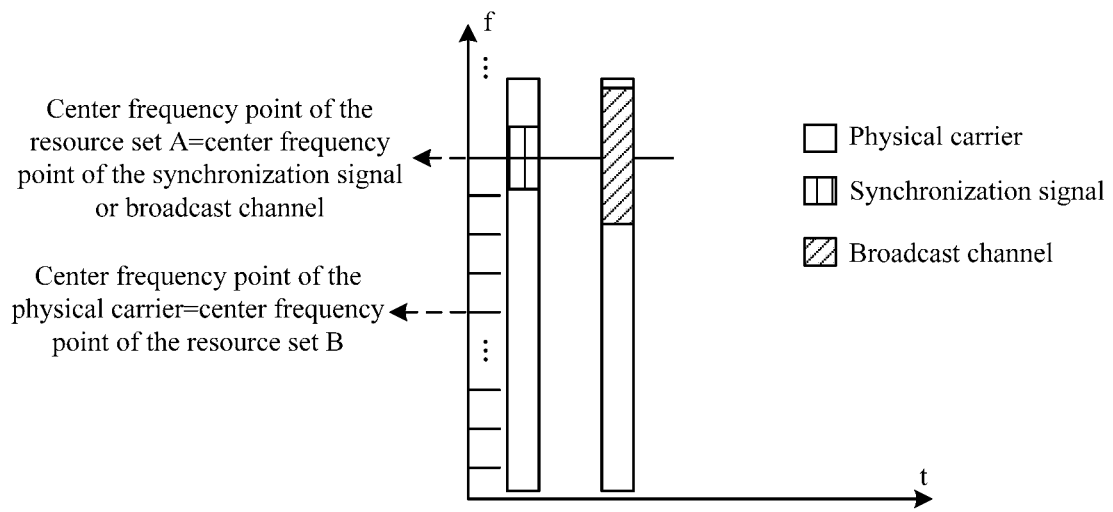
FIG. 12 is a schematic diagram of an application example 9 of the present disclosure.

As shown in FIG. 12, the first frequency domain resource set is used for mapping the synchronization signal and the broadcast channel. The center RE of the synchronization signal and the center RE of the broadcast channel are the same as the center RE of the first frequency domain resource set. The synchronization signal and the broadcast channel are sent at different times, that is, in the time division multiplexing mode. The number of the REs occupied by the synchronization signal is less than the number of the REs occupied by the broadcast channel. The number of the REs occupied by the first frequency domain resource set is the same as the larger one of the number of REs occupied by the synchronization signal and the number of REs occupied by the broadcast channel (that is, the number of the REs occupied by the first frequency domain resource set is the same as the number of the REs occupied by the broadcast channel). Alternatively, at the time of sending the synchronization signal, the number of the REs occupied by the first frequency domain resource set is the same as the number of the REs occupied by the synchronization signal, while at the time of sending the broadcast channel, the number of the REs occupied by the first frequency domain resource set is the same as the number of the REs occupied by the broadcast channel.

EXAMPLE 10

Figure 13:
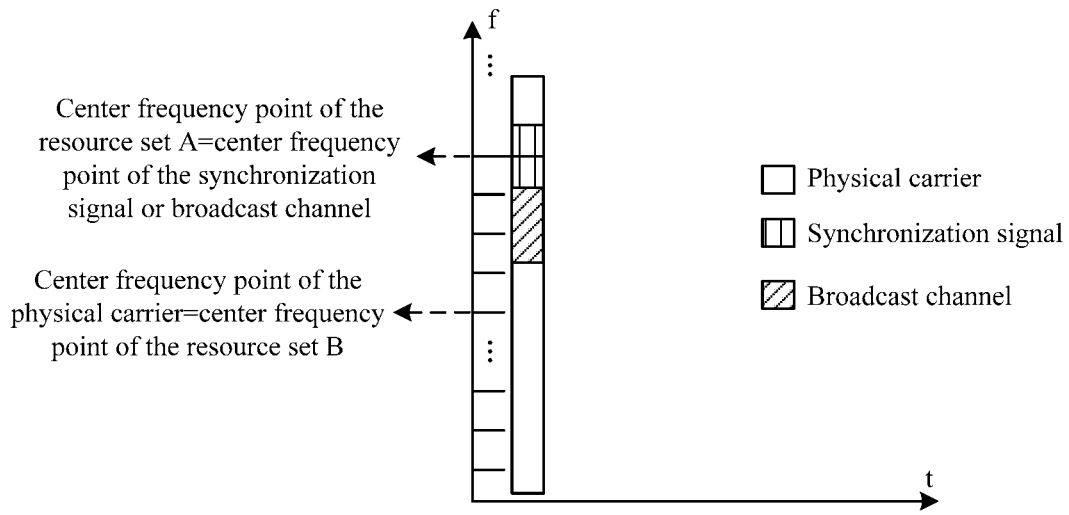
FIG. 13 is a schematic diagram of an application example 10 of the present disclosure.

As shown in FIG. 13, the first frequency domain resource set is used for mapping the synchronization signal and the broadcast channel. The center RE of the synchronization signal is the same as the center RE of the first frequency domain resource set. The synchronization signal and the broadcast channel are sent at the same time, that is, in the frequency division multiplexing mode.

EXAMPLE 11

Figure 14:
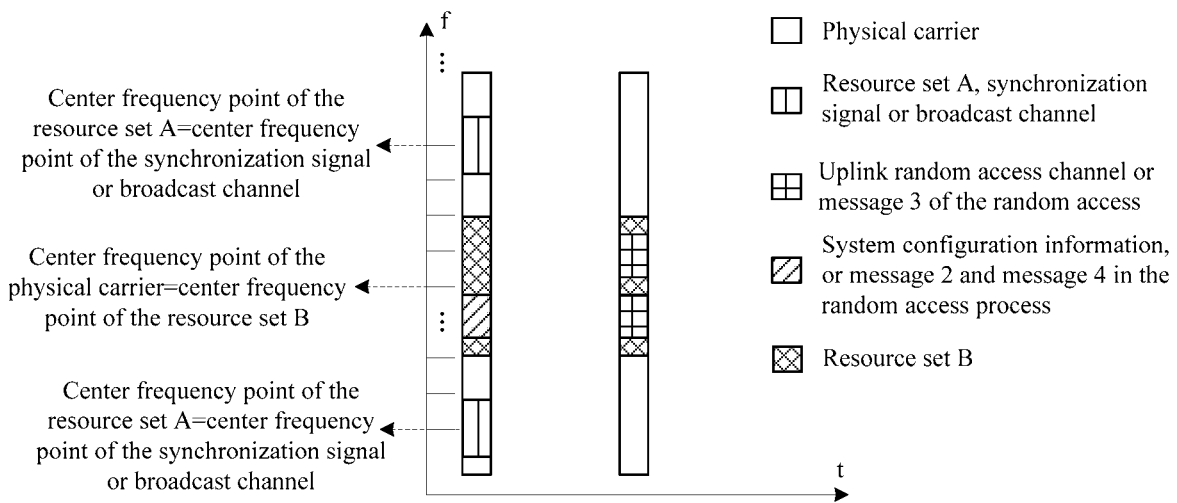
FIG. 14 is a schematic diagram of an application example 11 of the present disclosure.

As shown in FIG. 14, for the TDD system, the center frequency point of the physical carrier is located on the channel raster with the channel number n=18, the UE raster interval is 2000 kHz, the channel raster interval is 100 kHz, and the subcarrier interval is 15 kHz. The center frequency point of the physical carrier is f_low+1800 kHz.

The physical carrier has two first frequency domain resource sets. The indices of the center REs of these two first frequency domain resources sets are respectively 13 and −120. The first frequency domain resource set is used for mapping the synchronization signal or the broadcast channel. The center RE of the synchronization signal or the center RE of the broadcast channel is the same as the center RE of the corresponding first frequency domain resource set. The number of the REs of the first frequency domain resource set is the same as the number of the REs occupied by the synchronization signal or the broadcast channel corresponding to the first frequency domain resource set. The center frequency points of the synchronization signals of the two first frequency domain resources sets or the center frequency points of the broadcast channels of the two first frequency domain resources sets are respectively f_low+1800+195 kHz=f_low+1950 kHz and f_low+1800-1800 kHz=f_low kHz. The number of the center REs of the second frequency domain resource set is equal to the number of the center REs of the physical carrier. That is, the center frequency point of the second frequency domain resource set is f_low+1800.

Both of the two first frequency domain resource sets correspond to the second frequency domain resource set. The second frequency domain resource set is used for mapping the channels or the signals in the initial access process other than the synchronization signal and the broadcast channel, the channels or the signals include the random access channel, the channel carrying the system configuration information (i.e., the system information which is not sent in the broadcast channel), and the channel carrying the second message, the channel carrying the third message and the channel carrying the fourth message in the random access process.

EXAMPLE 12

The physical carrier has at least one first frequency domain resource set, and the index x(n) of the center RE of the first frequency domain resource set satisfies the following condition: within the subrange of the channel number n of the physical carrier, the absolute value of the difference of the indices of the center REs of first frequency domain resource sets corresponding to adjacent physical carrier channel numbers is $\Omega$, $\Omega+1$ or $\Omega-1$, where $\Omega$ is a constant, and n≥0. Specifically, within the subrange of the channel number n of the physical carrier, each channel number may have center REs of multiple possible first frequency domain resources sets, which forms a center RE set of the channel number. It is possible to select an RE from the center RE set of each of the channel numbers in such a manner that the difference of the indices of the center REs of the first frequency domain resource sets corresponding to adjacent physical carrier channel numbers is $\Omega$, $\Omega+1$ or $\Omega-1$.

For example, for the TDD system, the UE raster interval is 2000 kHz, the channel raster interval is 100 kHz, the subcarrier interval is 15 kHz, P=20, Q=P/2=10, and x(0)=0. Within the range of the channel number n∈[Q+m·P,Q+(m+1)·P−1] (when m=0, 10≤n≤29), the center RE set of the multiple possible first frequency domain resource sets of the physical carrier corresponding to the channel number n=18 is {13, −120, 147, −253, 280, −387, 413, −520, 547, −653, 680, −787, 813, −920, 947, −1053, 1080, −1187, 1213, −1320, 1347, −1453, 1480, −1587, 1613, −1720, 1747, −1853, 1880, −1987, 2013, −2120, 2147, −2253, 2280, −2387, 2413, −2520, 2547, −2653, 2680, −2787, 2813, −2920, 2947, −3053, 3080, −3187, 3213, −3320, 3347, −3453, 3480, −3587, 3613, −3720, 3747, −3853, 3880, −3987, 4013}.

The center RE set of the multiple possible first frequency domain resource sets of the physical carrier corresponding to the channel number n=19 is {7, −127, 140, −260, 273, −393, 407, −527, 540, −660, 673, −793, 807, −927, 940, −1060, 1073, −1193, 1207, −1327, 1340, −1460, 1473, −1593, 1607, −1727, 1740, −1860, 1873, −1993, 2007, −2127, 2140, −2260, 2273, −2393, 2407, −2527, 2540, −2660, 2673, −2793, 2807, −2927, 2940, −3060, 3073, −3193, 3207, −3327, 3340, −3460, 3473, −3593, 3607, −3727, 3740, −3860, 3873, −3993, 4007}.

The center RE set of the multiple possible first frequency domain resource sets of the physical carrier corresponding to the channel number n=20 is {0, 133, −133, 267, −267, 400, −400, 533, −533, 667, −667, 800, −800, 933, −933, 1067, −1067, 1200, −1200, 1333, −1333, 1467, −1467, 1600, −1600, 1733, −1733, 1867, −1867, 2000, −2000, 2133, −2133, 2267, −2267, 2400, −2400, 2533, −2533, 2667, −2667, 2800, −2800, 2933, −2933, 3067, −3067, 3200, −3200, 3333, −3333, 3467, −3467, 3600, −3600, 3733, −3733, 3867, −3867, 4000, −4000}.

The center RE 13, the center RE 7 and the center RE 0 are respectively selected from the center RE set of the physical carrier with the channel number n=18, the center RE set of the physical carrier with the channel number n=10 and the center RE set of the physical carrier with the channel number n=20. That is, when Ω=7, the absolute value of the difference of the indices of the center REs of the first frequency domain resource sets between adjacent channel numbers is Ω(=7) or Ω−1(=6).

Alternatively, the center RE −120, the center RE −127 and the center RE −133 are respectively selected from the center RE sets of the physical carriers with the channel numbers n=18, 19, and 20. That is, when Ω=7, the absolute value of the difference of the indices of the center REs of the first frequency domain resource sets between adjacent channel numbers is Ω(=7) or Ω−1(=6).

The resource set described above is also referred to as a virtual carrier (VC-X). The center resource element (RE) of the resource set may also be referred to as the direct current subcarrier (DC subcarrier) of the VC.

Figure 15:
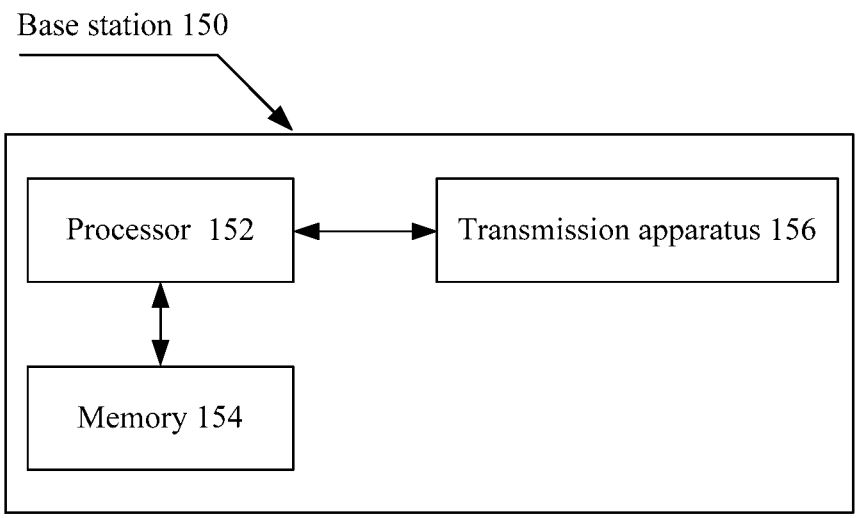
FIG. 15 is a block diagram of a hardware structure of a base station for implementing the signal sending method according to an embodiment of the present disclosure.

The method embodiment provided in FIG. 4 of the present application may be executed on a base station, a computer terminal or other similar devices. An example in which the method is executed on the base station is described below. FIG. 15 is a block diagram of a hardware structure of a base station for implementing the signal sending method according to an embodiment of the present disclosure. As shown in FIG. 15, the base station 150 may include one or more (only one is shown in FIG. 15) processors 152 (the processor 152 may be, but is not limited to, a processing device such as a microprocessor MCU or a programmable logic device FPGA), a memory 154 configured to store data, and a transmission device 156 configured to implement a communication function. It should be understood by those skilled in the art that the structure shown in FIG. 15 is merely illustrative and not intended to limit the structure of the electronic apparatus described above. For example, the base station 150 may further include more or less components than the components shown in FIG. 15, or has a configuration different from the configuration shown in FIG. 15.

The memory 154 may be configured to store software programs and modules of application software, such as program instructions/modules corresponding to the signal sending method in the embodiments of the present disclosure. The processor 152 is configured to execute the software programs and modules stored in the memory 154 to perform functional applications and data processing, that is, to implement the method described above. The memory 154 may include a high-speed random access memory, and may further include a nonvolatile memory, such as one or more magnetic storage devices, flash memories or other nonvolatile solid-state memories. In some examples, the memory 154 may further include memories that are remotely disposed with respect to the processor 152. These remote memories may be connected to the base station 150 via a network. Examples of the network described above include, but are not limited to, the Internet, an intranet, a local area network, a mobile communication network and a combination thereof.

The transmission device 156 is configured to receive or transmit data via a network. In one example, the transmission device 156 may be a radio frequency (RF) module, which is configured to communicate with the Internet in a wireless way.

Figure 16:
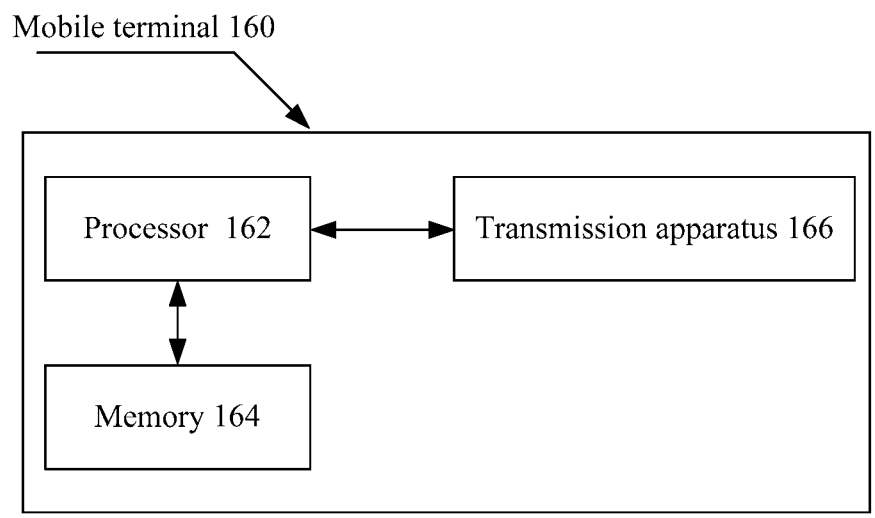
FIG. 16 is a block diagram of a hardware structure of a mobile terminal for implementing the signal receiving method according to an embodiment of the present disclosure.

The method embodiment provided in FIG. 6 of the present application may be executed on a mobile terminal, a computer terminal or other similar computing devices. An example in which the method is executed on the mobile terminal is described below. FIG. 16 is a block diagram of a hardware structure of a mobile terminal for implementing the signal receiving method according to an embodiment of the present disclosure. As shown in FIG. 16, the mobile terminal 160 may include one or more (only one is shown in FIG. 16) processors 162 (the processor 162 may be, but is not limited to, a processing device such as a microprocessor MCU or a programmable logic device FPGA), a memory 164 configured to store data, and a transmission device 166 configured to implement a communication function. It should be understood by those skilled in the art that the structure shown in FIG. 16 is merely illustrative and not intended to limit the structure of the electronic apparatus described above. For example, the mobile terminal 160 may further include more or fewer components than the components shown in FIG. 16 or may have a configuration different from the configuration shown in FIG. 16.

The memory 164 may be configured to store software programs and modules of application software, such as program instructions/modules corresponding to the signal receiving method in the embodiments of the present disclosure. The processor 162 is configured to execute the software programs and modules stored in the memory 164 to perform functional applications and data processing, that is, to implement the method described above. The memory 164 may include a high-speed random access memory, and may further include a nonvolatile memory, such as one or more magnetic storage devices, flash memories or other nonvolatile solid-state memories. In some examples, the memory 164 may further include memories that are remotely disposed with respect to the processor 162. These remote memories may be connected to the mobile terminal 160 via a network. Examples of the network described above include, but are not limited to, the Internet, an intranet, a local area network, a mobile communication network and a combination thereof.

The transmission device 166 is configured to receive or transmit data via a network. Specific examples of such a network may include a wireless network provided by a communication provider of the mobile terminal 160. In one example, the transmission device 166 includes a network interface controller (NIC), which may be connected to other network devices via a base station, thereby communicating with the Internet. In one example, the transmission device 166 may be a radio frequency (RF) module, which is configured to communicate with the Internet in a wireless way.

It will be understood by those skilled in the art that functional modules/units in all or part of the steps of the method, the system and the device disclosed above may be implemented as software, firmware, hardware and appropriate combinations thereof. In the hardware implementation, the division of functional modules/units mentioned in the above description may not correspond to the division of physical units. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage media, includes volatile and nonvolatile, removable and non-removable media implemented in any method or technology for storing information (such as computer-readable instructions, data structures, program modules or other data). The computer storage medium includes, but is not limited to, a RAM, a ROM, an EEPROM, a flash memory or other memory technologies, a CD-ROM, a digital versatile disc (DVD) or other optical disc storage, a magnetic cassette, a magnetic tape, a magnetic disk storage or other magnetic storage devices, or any other medium used for storing desired information and accessed by a computer. In addition, as is known to those skilled in the art, communication media generally include computer-readable instructions, data structures, program modules, or other data in modulated data signals such as carriers or other transmission mechanisms, and may include any information delivery media. The above are only optional embodiments of the present disclosure and are not intended to limit the present disclosure, and for those skilled in the art, the present disclosure may have various modifications and variations. Any modifications, equivalent substitutions, improvements and the like made within the spirit and principle of the present disclosure should fall within the scope of the present disclosure.

INDUSTRIAL APPLICABILITY

The center frequency point of at least one of the signal and the channel associated with the initial access of the terminal may be determined, and more flexible allocation of frequency domain resources to at least one of the signal and the channel may be implemented. When the UE raster is sparser, the position of the direct current (DC) subcarrier (or the center subcarrier) of at least one synchronization signal may have the least influence on the minimum bandwidth of the system, and the corresponding synchronization signal may be found by the UE, thereby reducing the limitation on the minimum system bandwidth. More frequency domain resources may be flexibly allocated to at least one of the signal and the channel (especially at least one of the signals and channels other than the synchronization or broadcast channel) in the initial access process, thereby improving the resource utilization efficiency.

What is claimed is:

1. A wireless communication method, comprising:
transmitting, by a first network node, a signal to a second network node using a first set of resource elements for a synchronization signal and a broadcast channel, wherein the first set of resource elements is in a physical carrier that is identified by a channel number in a range of channel numbers, wherein a center resource element of the first set of resource elements is associated with the channel number in the range, wherein the center resource element of the first set of resource elements corresponds to two frequency domain indices associated with two adjacent channel numbers, wherein the broadcast channel carries bandwidth information about a second set of resource elements, wherein the first set of resource elements includes a resource block assigned based on the center resource element of the first set of resource elements, and wherein the center resource element of the first set of resource elements overlaps with a boundary resource element of the resource block; and
transmitting, by the first network node based on the bandwidth information about the second set of resource elements, information to the second network node using the second set of resource elements.

2. The method of claim 1, wherein the information transmitted to the second network node indicates system information.

3. The method of claim 1, wherein a center resource element of the synchronization signal is same as the center resource element of the first set of resource elements.

4. The method of claim 3, wherein the synchronization signal and the broadcast channel are transmitted at a same time.

5. The method of claim 1, wherein multiple sets of the first set of resource elements correspond to one or more sets of the second set of resource elements.

6. The method of claim 1, wherein an absolute value of a difference between the two frequency domain indices is a constant.

7. A method for wireless communication, comprising:
receiving, by a second network node, a signal from a first network node using a first set of resource elements for a synchronization signal and a broadcast channel, wherein the first set of resource elements is in a physical carrier that is identified by a channel number in a range of channel numbers, wherein a center resource element of the first set of resource elements is associated with the channel number in the range, wherein the center resource element of the first set of resource elements corresponds to two frequency domain indices associated with two adjacent channel numbers, wherein the broadcast channel carries bandwidth information about a second set of resource elements, wherein the first set of resource elements includes a resource block assigned based on the center resource element of the first set of resource elements, and wherein the center resource element of the first set of resource elements overlaps with a boundary resource element of the resource block; and
receiving, by the second network node, information from the first network node using the second set of resource elements based on the bandwidth information about the second set of resource elements.

8. The method of claim 7, wherein the information from the first network node indicates system information.

9. The method of claim 7, further comprising:
determining, by the second network node, information identifying a frequency-domain position of a center resource element of a set of resource elements for the broadcast channel.

10. The method of claim 7, wherein a center resource element of the synchronization signal is same as the center resource element of the first set of resource elements.

11. The method of claim 10, wherein the synchronization signal and the broadcast channel are transmitted at a same time.

12. The method of claim 7, wherein multiple sets of the first set of resource elements correspond to one or more sets of the second set of resource elements.

13. The method of claim 7, wherein an absolute value of a difference between the two frequency domain indices is a constant.

14. A wireless communication device, comprising:
a processor, and
a memory including processor executable code, wherein the processor executable code upon execution by the processor configures the processor to:
transmit a signal to a second network node using a first set of resource elements for a synchronization signal and a broadcast channel, wherein the first set of resource elements is in a physical carrier that is identified by a channel number in a range of channel numbers, wherein a center resource element of the first set of resource elements is associated with the channel number in the range, wherein the center resource element of the first set of resource elements corresponds to two frequency domain indices associated with two adjacent channel numbers, wherein the broadcast channel carries bandwidth information about a second set of resource elements, wherein the first set of resource elements includes a resource block assigned based on the center resource element of the first set of resource elements, and wherein the center resource element of the first set of resource elements overlaps with a boundary resource element of the resource block; and
transmit, based on the bandwidth information about the second set of resource elements, information to the second network node using the second set of resource elements.

15. The device of claim 14, wherein the information transmitted to the second network node indicates system information.

16. The device of claim 14, wherein a center resource element of the synchronization signal is same as the center resource element of the first set of resource elements.

17. The device of claim 16, wherein the synchronization signal and the broadcast channel are transmitted at a same time.

18. The device of claim 14, wherein multiple sets of the first set of resource elements correspond to one or more sets of the second set of resource elements.

19. The device of claim 14, wherein an absolute value of a difference between the two frequency domain indices is a constant.

20. A wireless communication device, comprising:
a processor, and
a memory including processor executable code, wherein the processor executable code upon execution by the processor configures the processor to:
receive a signal from a first network node using a first set of resource elements for a synchronization signal and a broadcast channel, wherein the first set of resource elements is in a physical carrier that is identified by a channel number in a range of channel numbers, wherein a center resource element of the first set of resource elements is associated with the channel number in the range, wherein the center resource element of the first set of resource elements corresponds to two frequency domain indices associated with two adjacent channel numbers, wherein the broadcast channel carries bandwidth information about a second set of resource elements, wherein the first set of resource elements includes a resource block assigned based on the center resource element of the first set of resource elements, and wherein the center resource element of the first set of resource elements overlaps with a boundary resource element of the resource block; and
receive information from the first network node using the second set of resource elements based on the bandwidth information about the second set of resource elements.

21. The device of claim 20, wherein the information from the first network node indicates system information.

22. The device of claim 20, wherein the processor is further configured to:
determine information identifying a frequency-domain position of a center resource element of a set of resource elements for the broadcast channel.

23. The device of claim 20, wherein a center resource element of the synchronization signal is same as the center resource element of the first set of resource elements.

24. The device of claim 23, wherein the synchronization signal and the broadcast channel are transmitted at a same time.

25. The device of claim 20, wherein multiple sets of the first set of resource elements correspond to one or more sets of the second set of resource elements.

26. The device of claim 20, wherein an absolute value of a difference between the two frequency domain indices being a constant.

* * * * *